United States Patent [19]

Czempoyesh

[11] Patent Number: 4,780,351
[45] Date of Patent: Oct. 25, 1988

[54] PROTECTIVE COVER

[75] Inventor: Joseph Czempoyesh, Ontario, Canada

[73] Assignee: Wheelabrator Corporation of Canada Limited, Cambridge, Canada

[21] Appl. No.: 88,546

[22] Filed: Aug. 20, 1987

Related U.S. Application Data

[63] Continuation of Ser. No. 822,468, Jan. 27, 1986, abandoned.

[30] Foreign Application Priority Data

Dec. 19, 1985 [CA] Canada .................................. 498081

[51] Int. Cl.⁴ .............................................. B32B 5/02
[52] U.S. Cl. .................................... 428/122; 428/102; 428/137; 428/193; 428/196; 428/286; 428/246; 428/911
[58] Field of Search ............... 428/286, 911, 99, 102, 428/196, 193, 137, 122, 246; 52/3

[56] References Cited

U.S. PATENT DOCUMENTS

| | | | |
|---|---|---|---|
| 1,871,571 | 8/1932 | Weber | 52/3 |
| 4,522,871 | 6/1985 | Armellino et al. | 428/911 X |
| 4,535,017 | 8/1985 | Kuckein et al. | 428/102 |
| 4,574,105 | 3/1986 | Donovan | 428/911 |

*Primary Examiner*—Alexander S. Thomas
*Attorney, Agent, or Firm*—Irving M. Weiner; Joseph P. Carrier; Roland W. Norris

[57] ABSTRACT

A device for containing the force of an explosion comprises a blanket or curtain of flexible material that can be draped around a danger zone. The blanket or curtain comprises a plurality of layers of fabric, each layer having a tight, balanced weave independently woven from a tough, non-combustible yarn of at least 1,000 denier. The fabric is substantially interrupted by stitching in a central zone intended to take the main force of the explosion. The fabrics are bound together at their edges with a border of tough material extending around the periphery of the blanket or curtain.

23 Claims, 1 Drawing Sheet

PROTECTIVE COVER

This application is a continuation of Ser. No. 06/822,468 filed 1/27/86 now abandoned.

BACKGROUND OF THE INVENTION

This invention relates to a device for containing the force of an explosion, particularly, an electrical explosion.

In underground tunnels carrying high voltage cables the occurrence of explosions at the circuit connectors is relatively commmon. This can pose a major safety hazard to workmen in the tunnels and cause secondary damage to nearby cables. What usually happens is that the junction of two conductors within a circuit connector overheats and causes the oil filled connector to explode with considerable force. The explosion is accompanied by a rapid arc discharge to ground. The rapid electrical discharge has a similar effect to a lightning bolt.

Currently, there is no effective device for affording protection to personnel and equipment in the tunnels. An object of the present invention is to provide such a device that also has general application to other situations where explosion protection is required.

According to the present invention there is provided a device for containing the force of an explosion, comprising a blanket or curtain of flexible material that can be draped around a danger zone, said blanket or curtain comprising a plurality of layers of fabric, each layer having a tight, balanced weave independently woven from a tough, non combustible yarn of at least 1,000 denier, said fabric being substantially uninterrupted by stitching in a central zone intended to take the main force of the explosion, and said fabrics being bound together at their edges with a border of tough material extending around the periphery of the blanket or curtain, and attachment means disposed across said border.

The blanket or curtain, which is normally made of Kevlar (a trademark for poly(p-phenylene terephthalamide)), can be designed as a permanent fixture to be hung in the tunnel or as a portable device to be folded up and carried about in a truck. Eyelets are preferably provided around the perimeter of the blanket to enable it to be suspended from hooks attached to racks in the tunnel. As permanent fixtures, the curtains can be forty or more meters wide, whereas when used as supportable blankets they are usually about two or three meters wide.

When the blanket is placed over a circuit connector and an explosion occurs, the blanket or curtain can provide effective protection up to 15 kv when the fabric is made of Kevlar (a trademark for poly(p-phenylene terephthalamide)). For this purpose at least three layers of fabric should be employed. The first layer will usually become completely charred, but the remaining layers will provide effective protection both against the force of the explosion and the subsequent electrical discharge. When used as a permanent fixture, the curtain will prevent secondary damage to nearby cables or workmen in the tunnel. As a portable device, it will provide effective protection to workmen in manholes or underground tunnels. The workmen merely hang or drape the blanket around the danger zone.

In a preferred embodiment for use in a damp environment, the layers of fabric are coated on their inside surfaces with a mixture of Hypalon (a trademark for chlorosulphanated polyethylene) and a suitable thermoplastic such as polyvinyl chloride, nylons, fluorocarbons, linear polyethylene, polyurethane prepolymer, polystyrene, polypropylene, and cellulosic and acrylic resins.

The outer surfaces of the blanket are coated with a water repellent agent such as Zepel (a trademark for a fluorocarbon textile finish). The layers of fabric are cut together with a hot knife and the thermoplastic in the coating seals the edges together prior to the application of the tough border so as to prevent the ingress of moisture between the fabric layers. Also, when the fabrics are stitched together, the friction from the sewing needle momentarily softens the thermoplastic, which re-cools around the thread and thus avoids the ingress of moisture through the needle holes. A blanket or curtain constructed in this manner can provide effective protection against electrical explosions even when the curtain is partly immersed in water.

The invention will now be described in more detail, by way of example only, with reference to the accompanying drawings.

DETAILED DESCRIPTION OF PREFERRED EMBODIMENTS

Figure 1:
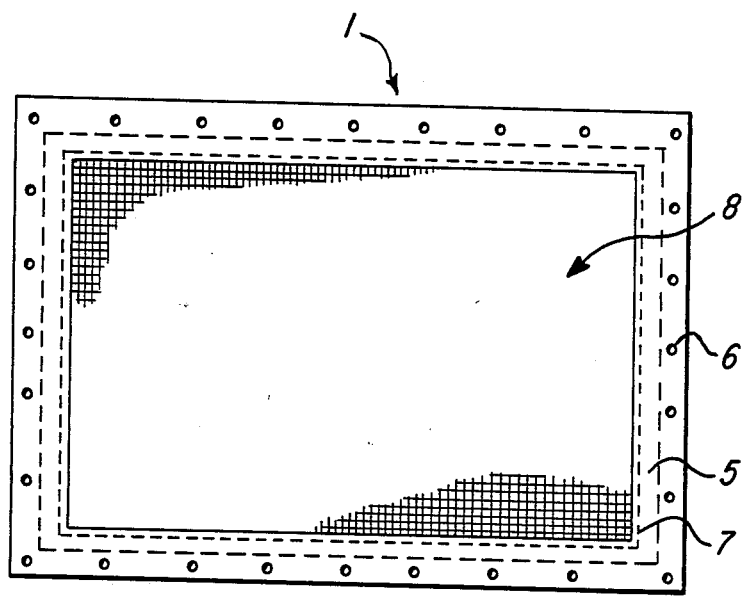
FIG. 1 is a plan view of a blanket or curtain for providing explosion protection.
Figure 2:
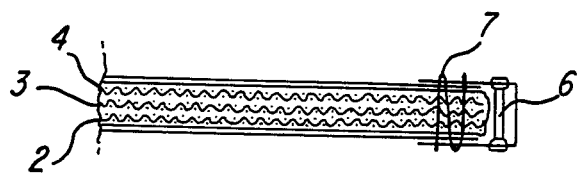
FIG. 2 is a partial cross-section through the blanket or curtain.

The blanket or curtain generally designated 1 comprises three layers 2,3,4 of closely woven fabric made of 1,500 denier Kevlar 29 (a trademark for poly(p-phenylene terephthalamide). The fabrics have a balanced plain weave with 24 counts per inch (94 counts per centimeter). The blanket is surrounded by a border 5 which may comprise a U-shaped border strip of tough nylon with a plurality of spaced eyelets 6. The border is stitched around the outside border area of the blanket by at least one row of stitching 7, such that the border strip is folded over the edge of the blanket so as to have a limb thereof extending in the border area on each side of the blanket, as shown in FIG. 2. The fabric layers 2,3,4, are separate layers and there is no stitching in the central area 8 designed to take the force of the explosion. The weave should be as tight as possible. With 1,500 denier Kevlar, the weave is normally $24 \times 24$ counts per inch. It is possible to use 1,000 denier Kevlar, in which case the thread count should be about $31 \times 31$ counts per inch, or even 3,000 denier Kevlar with a thread count of about $20 \times 20$ counts per inch. The thread count should in any event, normally exceed about $20 \times 20$ counts per inch to give the desired tight weave.

The blanket 1 is normally coated on its outer surfaces with a water repellent agent, such as zepel (a trademark for a fluorocarbon textile finish). For dry applications, the blanket can be used in the form described thus far. It is quite flexible and can be folded and conveniently carried about in a workmen's truck. It can be suspended around a danger zone on site and in the event of an electrical explosion it will give good protection to personnel in the area. The blanket will contain the fragments from an electrical connector and the Kevlar provides good insulation against the ensuing electrical discharge. The first layer of fabric may disintegrate, but the remaining layers will provide effective protection up to about 15 kv.

In the dry application discussed above, it may be convenient to apply the zepel (trademark) to both sides of each layer by passing the layers through a zepel bath.

The portable blanket may have a size of about 2×3 meters. Such a blanket can be conveniently carried to the site by workmen. Although it has been described mainly in connection with electrical explosions, the blanket can also be used in other applications, such as for providing protection around propane tanks. It should be noted that the layers of fabric are individually woven and not attached together except around the periphery.

In some applications, particularly when permanently installed, the blanket or curtain may be exposed to dampness or even immersed in water. For such application, the inner surfaces of the fabric layer are coated with (barr-coat), (trademark), which is a mixture of Hypalon (a trademark for cluorosulphanated polyethylene) and a thermoplastic such as polyvinyl chloride, nylon, fluorocarbon, linear polyethylene, polyurethane prepolymer, polystyrene, polypropylene, and cellulosic and acrylic resins. The Hypalon acts as a sealant. The thermoplastic ensures that no moisture can enter between the fabric layers either through needle holes or around the edges. During manufacture, the blanket is cut with a hot knife, and the thermoplastic in the barr-coat melts and seals the three layers together at their edges. Also, when the fabrics are penetrated by a sewing needle, the friction momentarily softens the thermoplastic in the barr-coat which subsequently cools and seals around the penetrating thread. With the three layer construction, both the surfaces of the inner fabric are coated with barr-coat (trademark) and only the inner surfaces of the outer fabrics are coated with barr-coat (trademark). The outer fabrics are first coated and then passed through a zepel bath to give the outer surfaces water repellent properties. The thickness of barr-coat (trademark) should be about 0.006 inches.

When used as a permanent installation, the blanket may have a width of as much as 40 meters or more and be permanently suspended on hooks attached to the cable racks in the tunnels. Kevlar (trademark) has been found to be the best material to use for the fabric in view of its high strength, incombustibility, and light weight. Weight for weight, Kevlar is five times stronger than steel. In certain low voltage applications other materials, such as fibre glass, can be used.

Tests were carried out on blankets of different construction. A pair of electrodes, one grounded, were placed across the blanket and the current measured. By way of comparison, at 0.7 kv, 2.25 milli-amps flowed through four layers of Kevlar fabric and breakdown occurred at less than 1 kv. With a damp 3-layered blanked having barr-coat (trademark) on the inner surfaces, no detectable current flowed at 5 kv, 0.1 milli-amp flowed at 10.2 kv, and 1.1 milli-amp flowed at 15 kv, and breakdown occurred at 18 kv. By effectively keeping moisture out of the space between the several layers, the breakdown performance of the blanket under humid comditions can be dramatically improved.

Particularly for portable applications, a line of straps can be stitched to the blanket around the central zone, but within the nylon border.

The embodiment of the invention in which an exlusive property or privilege is claimed are defined as follows:

1. A device for containing the force of an explosion, comprising:
   a blanket or curtain of flexible material that can be draped around a danger zone;
   said blanket or curtain having a peripheral border area and a central area circumscribed by said border area;
   said blanket or curtain comprising a plurality of separate layers of fabric, each layer having a tight, balanced weave independently woven from a tough, non-combustible poly (p-phenylene terephthalamide) yarn of at least 1,000 denier;
   a border strip of tough reinforcing material extending completely around the periphery of the blanket or curtain in said border area and lying adjacent the edge of the blanket or curtain so as to have a limb thereof extending in said border area on each side of the blanket or curtain;
   means for binding said fabric layers together with said strip of tough material within said border area;
   said fabric layers being substantially uninterrupted by stitching and being free and unconnected to each other in said central area;
   attachment means disposed around said border area and extending through said strip of tough material to permit said blanket or curtain to be suspended or attached to equipment or external elements;
   the inside surface of said fabric layers being coated with a composition consisting of a thermoplastic and a water resistant agent; and
   said fabric layers being sealed together around the edges by means of said thermoplastic to prevent the ingress of moisture, such that moisture is excluded from the space between said fabric layers.

2. A device according to claim 1 wherein the weave is a plain weave.

3. A device according to claim 2 wherein the thread count is at least 20×20 counts per inch.

4. A device according to claim 2 wherein the denier is at least 1,500 and the thread count at least 24×24 counts per inch.

5. A device according to claim 2 wherein the denier is at least 1,000 and the thread count at least 31×31 counts per inch.

6. A device according to claim 1 wherein said water resistant agent is a chlorosulphonated polyethylene.

7. A device according to claim 1 comprising at least three said layers, with the middle layer or layers being coated on both sides with said composition.

8. A device according to claim 1 wherein the outer surfaces of the blanket or curtain are treated with a water repellent agent.

9. A device according to claim 8 wherein said water repellent agent is a fluorocarbon.

10. A device according to claim 1, wherein:
    said border strip is substantially U-shaped, and is folded over said edge of said blanket or curtain so as to have said limb thereof extending in said border area on each side of said blanket or curtain.

11. A device according to claim 10 wherein said attachment means includes eyelets.

12. A device according to claim 11, wherein said border strip is made of nylon.

13. A device according to claim 11, wherein said water resistant agent is a chlorosulphonated polyethylene.

14. A device according to claim 11, wherein the outer surfaces of said blanket or curtain are treated with a water repellant agent.

15. A device according to claim 10 wherein said border strip is made of nylon.

16. A device according to claim 10, wherein said water resistant agent is a chlorosulphonated polyethylene.

17. A device according to claim 10, wherein the outer surfaces of said blanket or curtain are treated with a water repellant agent.

18. A device according to claim 1 wherein said attachment means includes eyelets.

19. A device according to claim 18, wherein said border strip is made of nylon.

20. A device according to claim 18, wherein said water resistant agent is a chlorosulphonated polyethylene.

21. A device according to claim 18, wherein the outer surfaces of said blanket or curtain are treated with a water repellant agent.

22. A device according to claim 1 wherein said border strip is made of nylon.

23. A device according to claim 22, wherein the outer surfaces of said blanket or curtain are treated with a water repellant agent.

* * * * *

UNITED STATES PATENT AND TRADEMARK OFFICE
CERTIFICATE OF CORRECTION

PATENT NO. : 4,780,351

DATED : October 25, 1988

INVENTOR(S) : Joseph Czempoyesh

It is certified that error appears in the above-identified patent and that said Letters Patent is hereby corrected as shown below:

```
Column 1, line 44, correct the spelling of --preferably--.
Column 2, line 36, after ")" insert --)--.
Column 3, line 56, change "blanked" to --blanket--;
         line 61, correct the spelling of --conditions--;
         line 66, change "embodiment" to --embodiments--.
```

Signed and Sealed this

Twenty-eighth Day of March, 1989

Attest:

DONALD J. QUIGG

*Attesting Officer*      *Commissioner of Patents and Trademarks*